United States Patent [19]
Johnston et al.

[11] Patent Number: 5,232,481
[45] Date of Patent: Aug. 3, 1993

[54] GLASS DIMENSIONAL CONTROL USING ION EXCHANGE

[75] Inventors: Lisa E. Johnston, Baldwinsville; Larry G. Mann, Paint Post; J. Mario Quintal, Campbell, all of N.Y.

[73] Assignee: Corning Incorporated, Corning, N.Y.

[21] Appl. No.: 813,552

[22] Filed: Dec. 26, 1991

[51] Int. Cl.$^5$ ............................................. C03C 10/10
[52] U.S. Cl. ...................... 65/30.130; 65/31; 65/33
[58] Field of Search .............. 65/31, 33, 30.13, 30.11

[56] References Cited

U.S. PATENT DOCUMENTS

| | | | |
|---|---|---|---|
| 2,971,853 | 2/1961 | Stookey | 65/33 X |
| 3,997,312 | 12/1976 | Besselink | 65/30.13 |
| 4,259,406 | 3/1981 | Borrelli | 65/30.11 X |
| 5,062,877 | 11/1991 | Borrelli et al. | 65/30.13 |

*Primary Examiner*—Robert L. Lindsay
*Attorney, Agent, or Firm*—T. M. Schaeberle

[57] ABSTRACT

This method is directed at a method for making selectively sculptured lithium silicate crystal-containing glass articles. A photonucleable, glass body is selectively exposed to short wave radiation and then heat treated to cause the development of crystals in those areas of the glass body which had been exposed to shortwave radiation. Those crystal-containing areas are then removed by acid etching and the resulting sculptured glass articles are thereafter exposed to short wave radiation and subsequently heat treated to obtain a degree of crystallization.

The inventive method further comprises an improvement step of fabricating glass articles that result in crystal-containing glass articles with smaller intermediate dimensions than the desired final dimensions and subjecting the crystal-containing glass articles to an ion exchange process which exchanges potassium ions for sodium and/or lithium ions at a temperature of about at least 500° C. for a time sufficient to cause the crystal-containing glass article to grow to the desired final dimension.

8 Claims, 1 Drawing Sheet

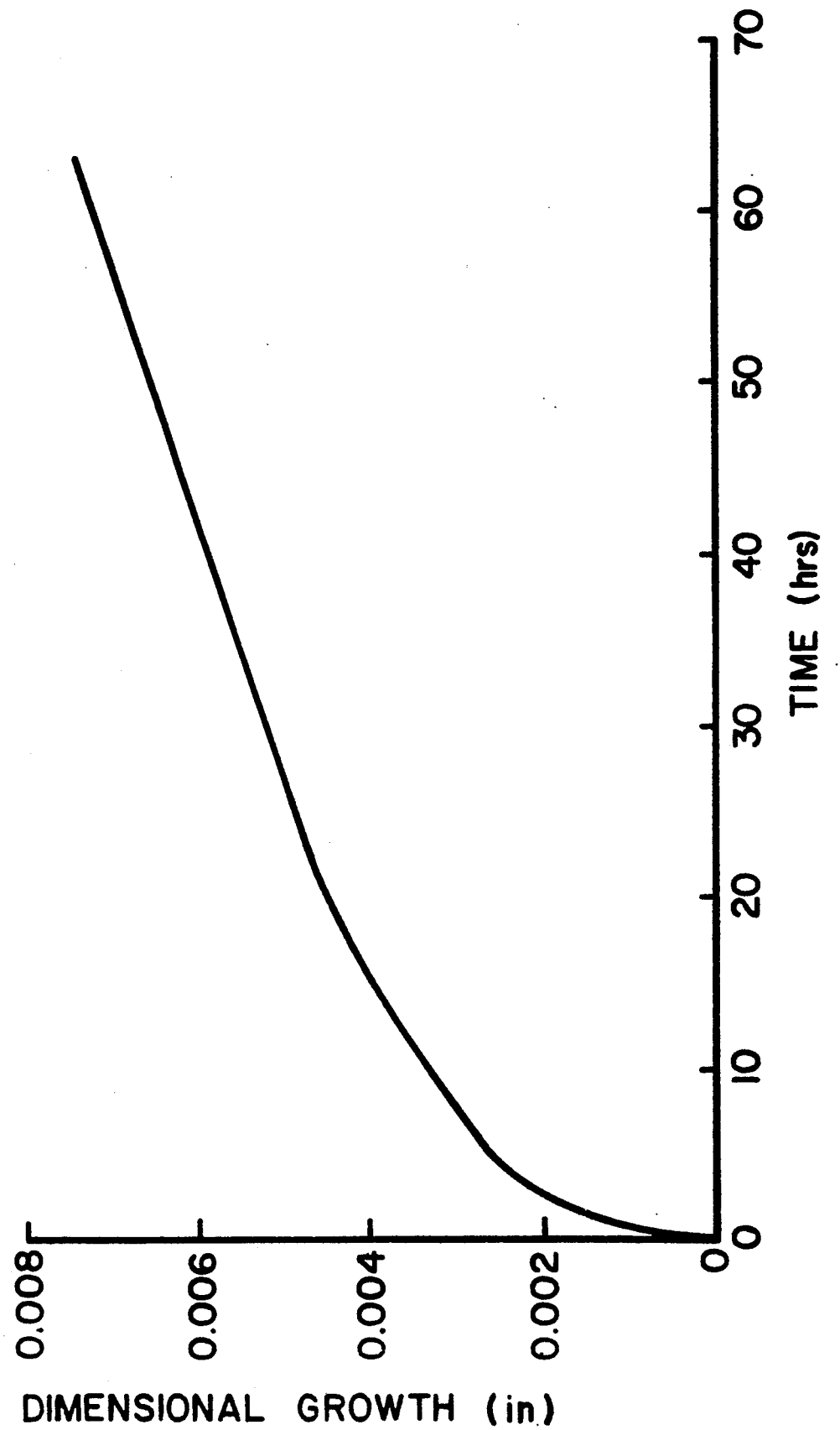

GLASS DIMENSIONAL CONTROL USING ION EXCHANGE

BACKGROUND OF THE INVENTION

U.S. Pat. No. 2,971,853 (Stookey) discloses photonucleable glasses that are capable of being chemically sculptured and which can then be converted into crystal-containing glass articles upon subsequent heat-treatment. That is, the glasses are susceptive to the development of opacification in selected zones thereof due to the generation of crystals therein via the selective radiation of those zones by shortwave (commonly ultraviolet) radiation followed by heat treatment. These glasses are then treated with a dilute aqueous hydrofluoric acid solution which selectively dissolves the crystallized regions leaving only the glass zones. The remaining glass is then re-exposed to the shortwave radiation and reheated, i.e., cerammed to generate crystals.

Currently, the above described glass article forming process, as commercially utilized, only allows a dimensional control of the centerline specification as precise as ±0.0015 inch/inch. However, in today's competitive marketplace, some customers demand much tighter dimensional centerline specifications on their products than the present commercial process is capable of producing on a consistent basis. As a result, the current process typically produces a select rate for those products which is below 25%. The cause of this lack of processing control is that the shrinkage the products experience during the final heat treatment is variable as well as, by nature, difficult to control and predict. Because select rates in the 15-25% range are not cost effective, means to increase productivity for these products, i.e., increase the select rate, are always sought. It is to just such a means which the improvement invention disclosed herein is directed.

Accordingly, the primary objective of the present invention was to devise an improved method of making crystal-containing glass articles within precise dimensions, i.e., increase the process's final product dimensional control, which would, in turn, increase the processing select rates for this process.

SUMMARY OF THE INVENTION

We have found that the above objective, as well as others which will become apparent from the following description, can be achieved via the improved method set out below.

The improved method involves fabricating a photonucleable, lithium silicate glass body, which glass body is exposed to short wave radiation and subsequently heat-treated to obtain a degree of crystallization. The improvement to this method involves fabricating undersized glass articles that result in crystal-containing glass articles that are smaller than the required final dimension. These undersized crystal-containing glass articles are then subjected to an ion exchange process which exchanges sodium and/or lithium ions for potassium ions at a temperature of about at least 500° C. for a time sufficient to cause the crystallized article to grow to the desired final dimension.

It should be noted that the above method may be utilized for a non-photonucleable, crystallizable lithium silicate as well. This method is easily adapted to this material by eliminating the exposure to short wave radiation step inherent in photonucleable articles.

Further modifications of the above general method may include adding selective crystallization and etching prior to the overall exposure to short wave radiation and subsequent heat-treating. This slight modification would allow the process to be used for the fabrication of crystal-containing glass articles with more intricate shapes.

Whereas any source of exchangeable potassium ions may employed in accordance with known ion exchange practice, we have found baths of molten salts to be most convenient for our purposes. Nitrate salts, specifically $KNO_3$ in this case, are commonly utilized although others, such as molten $K_2Cr_2O_7$ or a molten mixture of $KCl+K_2Cr_2O_7$, are also suitable.

In general, the period of the ion exchange reaction is dependent upon the size difference between the measured post heat-treatment dimension and that final dimension desired. It is self evident that the greater the difference between post heat-treatment dimension and the final product sought, the longer the ion exchange reaction needed for that part being produced.

PRIOR ART

Ion exchange from a molten salt bath, for glass decorating and coloring, dates back to U.S. Pat. No. 2,075,446 (Leibig). More recently, ion exchange has received a great deal of attention in connection with development of chemical strengthening procedures.

This ion exchange method of chemical strengthening involves the development of compressive stresses within the surface layer of the glass articles. Relatively large ions, such as potassium or sodium, migrate into a glass and exchange position with smaller ions in the glass, such as sodium or lithium ions. The physical crowding caused by such large-for-small ion exchange creates compressive stresses. One such method of chemical strengthening by ion exchange is disclosed in U.S. Pat. No. 4,483,700 (Forker et al.) wherein ions from a sodium silicate glass are exchanged for larger ions, e.g. $Na^+$ or $K^+$, at temperatures both above and below the glass strain point. Unlike this reference, the ion exchange in the present invention is not directed at, nor does it result in, significant compressive stresses being developed.

However, chemical strengthening through ion exchange is well established in the glass-ceramics field. U.S. Pat. No. 3,573,076 (Rittler) discloses a strengthening effect achieved through an ion exchange taking place within a surface layer of the glass-ceramic article wherein potassium ions from an external source are exchanged for lithium ions in the $\beta$-quartz to cause compressive stresses to be developed in this surface layer. Similarly, in U.S. Pat No. 3,573,077 (Beall et al.), the compressive stresses are developed through the exchange of lithium ions, from an external source, for the magnesium ions in the $\beta$-quartz crystals. Lastly, U.S. Pat. No. 3,585,053 (Rittler) discloses consecutive ion exchange reactions wherein lithium ions from an external source are first exchanged for magnesium ions in the $\beta$-quartz crystals within a surface layer and thereafter sodium and/or potassium ions from an external source are exchanged for the lithium ions which have diffused into the $\beta$-quartz during the first exchange. Unlike those references, however, the ion exchange in the present invention is not directed toward, nor does it result in, the creation of significant compressive stresses and the subsequent significant increase in strength.

Ion exchange has also been used in glass technology as a means for making and modifying optical devices. U.S. Pat. No. 4,518,222 (Borrelli et al.) discloses a photonucleable, lithium silicate glass body which is selectively crystallized to provide a crystalline matrix surrounding each lens in a array of spherically-shaped clear lens integral with and rising above at least one matrix surface. The ion exchange in this lens array involved exchanging sodium and/or potassium ions from an external source for lithium ions within the surface of the clear lens to create variable alkali metal ion concentrations defined by both radial and axial concentration gradients. U.S. Pat. No. 5,062,877 (Borrelli) discloses an improvement upon the above optical method, comprising conducting the ion exchange at a temperature between about 25°–125° C. above the annealing point of the lithium silicate glass to produce lenses exhibiting a greater axial height. Unlike the present invention, glass areas surrounded by a crystalline matrix are required, so that the ion exchange causes the crystalline areas to squeeze the glass areas in order to cause the lens to protrude above the surface.

BRIEF DESCRIPTION OF THE DRAWING

The FIGURE is a graphical illustration of the typical ion exchange time (hrs) versus the growth (in.) relationship for a lithium silicate crystal-containing glass article.

DESCRIPTION OF THE PREFERRED EMBODIMENTS

As mentioned earlier, the Stookey patent discloses a method of making crystal-containing glass articles utilizing photosensitivity opacifiable glass. For this reason the teachings of the Stookey patent are incorporated herein. The crystal phases disclosed are lithium disilicate and metasilicate, barium disilicate and alkali metal fluoride. The lithium silicate glasses are commercially available and provide substantial crystal formation and thus they have been employed in the studies described herein.

Specifically, the preferred embodiment utilized a photonucleable, crystallizable, lithium silicate glass marketed by Corning Incorporated, Corning, N.Y., as Corning Code 8603. This glass has the following composition, expressed in terms of parts by weight on the oxide basis. (Because the sum of the individual constituents closely approximates 100, for all practical purposes the values listed may be deemed to represent weight percent).

| $SiO_2$ | 79.1 | $Sb_2O_3$ | 0.4 |
|---|---|---|---|
| $Li_2O$ | 9.4 | Au | 0.0012 |
| $Na_2O$ | 1.6 | Ag | 0.115 |
| $K_2O$ | 4.2 | $CeO_2$ | 0.015 |
| $Al_2O_3$ | 4.2 | SnO | 0.003 |
| ZnO | 1.0 | | |

Specific examples, comprised of the above composition were, prepared as follows:

The desired final dimension of the crystal-containing glass rectangular plate samples prepared was to be as follows: length of about 7.5", a width of about 3", thickness of about 0.05" and a centerline dimension of about 6.75".

The lithium silicate glass was mixed, melted and formed into glass articles using conventional techniques. The formed glass articles' dimensions were such that the dimensions following final heat-treating were less than the desired finished dimensions outlined above, i.e., undersized glass articles which result in undersized lithium crystal-containing glass articles.

Portions of these undersized glass articles were then selectively nucleated in a predetermined pattern by exposing those portions to short-wave radiation. This was accomplished in the instant embodiment by first preparing the samples for selected exposure by covering one face of the rectangular glass plates with a chrome dot mask. Each mask consisted of transparent dots, located along the centerline of the rectangular articles' lengths, imprinted in a opaque matrix. The distance from outermost dot to outermost dot, termed the centerline dimension, was somewhat less than the desired 6.75". Each masked rectangular plate was then subjected to ultraviolet radiation from an Oriel solar simulator for about 5–10 minutes.

Following exposure, the glass article was then heated to a temperature 610° C. and maintained at this temperature for 45 minutes—a time sufficient to cause the article to become nucleated and crystallized to a degree.

The next step consisted of treating the selectively crystallized article with a dilute aqueous solution of hydrofluoric acid in order to dissolve the more soluble crystallized portions, i.e. those dot portions along the centerline which were exposed to the short wave radiation. In the instant embodiment this selective etching was achieved using a hydrofluoric acid solution containing 6% HF by weight. Each resultant glass article now possessed holes rather than crystallized circular portions along the lengths of the centerline. Again, note that the centerline dimension of the holes, as was the case with the crystallized dots, was such that, following final heat treatment, the resulting crystal-containing glass article had a centerline dimension of somewhat less than the desired dimension of approximately 6.75".

The entire article was again exposed to short-wave radiation using the same technique as was used in the selective radiation step. Again, exposure allowed the article to become nucleated upon subsequent heat-treatment.

Each glass article was then heat-treated in order to transform the glass article into a lithium silicate crystal-containing glass article. This heat treatment involved first heating the article to a temperature of 610° C. and maintaining that temperature for about 45 minutes. This time was sufficient to cause the article to become nucleated, and crystallized to a degree. Next the article was further heated to a temperature of 800° C. and maintained at that temperature for about 60 minutes, a time sufficient to cause the article to further crystallize in situ. Following this heat-treatment the lithium silicate crystal-containing glass article was then cooled to room temperature.

The last step involved ion exchanging the sodium and/or lithium ions in the glass for the potassium ions whose source was an ion exchange bath of molten $KNO_3$ salt. The ion exchange took place in a stainless steel ion exchange tank wherein the bath with was maintained at a temperature of at least 515° C. and a pH of between 6.5 and 7.5.

The ion exchange procedure utilized the following general steps:
 (1) the sample was carefully cleaned;
 (2) the sample was introduced into the furnace holding the salt bath which had been equilibriated at the desired ion exchange temperature and pre-heated therein for fifteen minutes;

(3) the sample was thereafter immersed into the bath and maintained therein for a predetermined period of time; and then (4) the sample was withdrawn from the bath allowed to cool to room temperature, and carefully cleaned.

Table I records the increase in size exhibited by the samples after ion exchange reactions of various times. The bath of molten $KNO_3$, maintained at 515° C. and a pH of between 6.5 and 7.5, provided the source of exchangeable $K^-$ ions.

TABLE I

| Sample No. | Ion Exchange Time (hrs) | Growth (in.) |
|---|---|---|
| 1 | 2 | .00186 |
| 2 | 2 | .00182 |
| 3 | 4 | .00263 |
| 4 | 4 | .00232 |
| 5 | 6 | .00281 |
| 6 | 6 | .00281 |
| 7 | 8 | .00307 |
| 8 | 8 | .00305 |
| 9 | 16 | .00395 |
| 10 | 16 | .00393 |
| 11 | 23 | .00466 |
| 12 | 23 | .00487 |
| 13 | 63 | .00694 |
| 14 | 63 | .00790 |

In general, the period of the ion exchange reaction for an undersized article is dependent upon the size difference between the measured post heat-treated dimension and the final dimension desired. It is self-evident that the greater the difference between those dimensions for any particular article, the longer the ion exchange reaction will be for that part being produced. The general equation for ion exchange is as follows:

$$Y = A[C_1,C_2,T] + B[C_1,C_2,T] + C[C_1,C_2,T]\sqrt{X} + D[C_1,C_2,T]/X^2$$

wherein Y=growth, X=time, $C_1$=concentration of exchangeable glass ion, $C_2$=concentration of exchangeable salt bath ion and T=temperature.

The preferred embodiment 14 samples' time and growth experimental data, shown above in Table I, was plotted to generate the specific time versus growth curve as represented by the FIG. 1. From this curve the following equation specific for this experimental data, relating time to growth for a 515° C. $KNO_3$ bath maintained at a pH between 6.5 and 7.5, was calculated:

$$Y = [A + B(X) + C\sqrt{(X)} ) + D/X^2]$$

wherein Y=growth (in.), X=time (hrs), A=0.7304047, B=0.004564496, C=0.8071678 and D=−0.015848. Assuming that the above conditions remain constant, e.g., article dimensions and composition, bath conditions and type, this curve, will allow the calculation of the ion exchange time for any undersized crystal-containing article.

It will be appreciated that, although the ion exchange reaction for the preferred embodiment was conducted in a bath maintained at a temperature of 515° C., the ion exchange for these rectangular plate samples could take place in baths of higher temperatures. Ion exchange bath temperatures as high as those temperatures at which the bath itself becomes unstable may be used. It is contemplated that the ion exchange reaction rate would increase as the temperature of the bath increased. Although the curve and corresponding equation would not correspond exactly to the specific curve of the preferred embodiment in the FIGURE, it would, however, follow the form of the general equation. The best possible course would be to ion exchange a number of samples at the different bath temperature and generate the specific ion exchange curve and corresponding equation for that ion exchange bath temperature.

If, on the other hand, one were fabricating products of a different dimension and of different composition or if one were utilizing a different ion exchange bath, again the curve and equation for the changed conditions would be slightly different than that specific curve and equation of the preferred embodiment. Therefore, it again is recommended that a number of samples be ion exchanged to obtain data on the ion exchange and corresponding growth rate for the changed conditions. It follows from this data that the equation and the corresponding growth versus ion exchange time curve may be developed.

TABLE II

| Sample No. | Growth (in.) |
|---|---|
| 15 | 0.00281 |
| 16 | 0.00281 |
| 17 | 0.00272 |
| 18 | 0.00259 |
| 19 | 0.00266 |
| 20 | 0.00270 |
| 21 | 0.00275 |
| 22 | 0.00283 |
| 23 | 0.00292 |
| 24 | 0.00279 |
| 25 | 0.00275 |
| 26 | 0.00288 |
| 27 | 0.00273 |
| 28 | 0.00283 |
| 29 | 0.00283 |
| Average Growth = | 0.00277 in. |
| Standard Deviation = | 0.0000829 in. |
| 3 Standard Deviations = | 0.0002487 in. |

Table II reports the increase in size exhibited by 15 samples after an ion exchange reaction of six hours. Again, the source of exchangeable $K^+$ ions was provided by bath of molten $KNO_3$, maintained at 515° C. and a pH of between 6.5 and 7.5. As can be observed from a study of Table II, the repeatability of the growth was quite consistent from sample to sample.

While not intending to be limited by theory, the mechanism of growth is presently believed to be volumetric expansion of the crystal-containing glass which occurs as result the large-for-small ion exchange utilized. Specifically, in the above examples, assuming that the article's lithium ions are tied up as lithium disilicate or lithium metasilicate, it is thought that the predominate ion exchange would involve replacing the smaller sodium ions in the residual glass phase by the larger potassium ions found in the ion exchange bath. On the other hand, it is possible that in articles possessing a lesser degree of crystallinity, some of the lithium ions may be left in the residual glass. That being the case, it is thought that the ion exchange would be a combination involving exchanging both the lithium and/or sodium ions in the glass for potassium ions found in the molten salt bath.

We claim:

1. In a method for making crystal-containing glass articles of a precise and predetermined final dimension wherein an intermediate lithium silicate article is formed and subsequently heat-treated to obtain a degree of lithium silicate crystallization;

the improvement comprising fabricating intermediate glass articles with a smaller dimension than the predetermined final dimension and subjecting the intermediate crystal-containing glass articles to an ion exchange process, wherein potassium ions from an external source are exchanged with sodium and/or lithium ions in the intermediate crystal-containing glass article at a temperature of at least 500° C. and for a time sufficient to cause the intermediate crystal-containing glass article to grow to the predetermined final dimension, the time being dependent upon the time versus growth equation $Y=[A+B(X)+C(X)+D/X^2]$, wherein $Y=$ growth (in.) and $X=$ time (hrs).

2. The method as claimed in claim 1 wherein $A=0.7304047$, $B=0.004564496$, $C=0.8071678$ and $D=(-)0.015848$ and wherein the external source is maintained at a temperature of 515° C. and a pH of between 6.5 and 7.5.

3. The method as claimed in claim 1 wherein the intermediate glass article is photonucleable and prior to the heat treating, at least a portion of the intermediate glass article is exposed to shortwave radiation.

4. The method as claimed in claim 3 wherein prior to the heat treating, selected areas of the intermediate glass article are exposed to short wave radiation and heat treated to cause the development of crystals in those selected areas, thereafter those crystal-containing areas are removed by acid etching and the resulting glass article is subsequently exposed to a second short wave radiation treatment.

5. A method for growing a lithium silicate crystal-containing glass article a predetermined amount comprising the steps of:

(1) heat treating the glass article to develop lithium silicate crystal-containing glass article; and (2) subjecting the crystal-containing glass article to an ion exchange process wherein potassium ions from an external source are exchanged with sodium and/or lithium ions at a temperature of at least 500° C. and for a time sufficient to cause the crystal-containing article to grow a predetermined amount, the time required to cause the crystal-containing article to grow a predetermined amount being dependent upon the time versus growth equation $Y=(A+B(X)+C(X)+D/X^2)$, wherein $Y=$ growth (in.) and $X=$ time (hrs).

6. The method as claimed in claim 5 wherein $A=0.7304047$, $B=0.004564496$, $C=0.8071678$ and $D=(-)0.015848$, and wherein the external source is maintained at a temperature of 515° C. and a pH of between 6.5 and 7.5.

7. The method as claimed in claim 5 wherein the glass article is photonucleable and wherein prior to the heat treatment, at least a portion of the glass article is exposed to shortwave radiation.

8. The method as claimed in claim 6, wherein prior to heat treating, selected areas of the intermediate glass article are exposed to short wave radiation and heat treated to cause the development of crystals in those selected areas, thereafter those crystal-containing areas are removed by acid etching and the resulting glass article is subsequently exposed to a second short wave radiation treatment.

* * * * *